(12) United States Patent
Allen et al.

(10) Patent No.: US 6,871,499 B1
(45) Date of Patent: Mar. 29, 2005

(54) OIL PRESSURE DETECTOR FOR ELECTRIC ASSISTED TURBOCHARGER

(75) Inventors: John F. Allen, El Segundo, CA (US); Gerhard E. Delf, New Baltimore, MI (US); Rhett Hedrick, Santa Barbara, CA (US); Daniel Black, Santa Barbara, CA (US); Kevin Birch, Santa Barbara, CA (US)

(73) Assignee: Honeywell Interntional, Inc., Morristown, NJ (US)

( * ) Notice: Subject to any disclaimer, the term of this patent is extended or adjusted under 35 U.S.C. 154(b) by 0 days.

(21) Appl. No.: 10/743,691

(22) Filed: Dec. 20, 2003

(51) Int. Cl.⁷ .............................................. F02B 33/44
(52) U.S. Cl. ..................... 60/608; 60/607; 60/605.3; 417/407
(58) Field of Search ........................ 60/608, 607, 609, 60/605.3, 597, 417; 417/407

(56) References Cited

U.S. PATENT DOCUMENTS

| | | | | |
|---|---|---|---|---|
| 3,038,318 A | * | 6/1962 | Hanny ......................... | 417/407 |
| 4,142,608 A | * | 3/1979 | Sarle ........................... | 417/407 |
| 4,279,576 A | * | 7/1981 | Okano et al. ................ | 417/407 |
| 4,953,110 A | * | 8/1990 | Chartrand ..................... | 60/602 |
| 4,981,017 A | | 1/1991 | Hara et al. .................... | 60/608 |
| 5,024,057 A | * | 6/1991 | Kawamura .................... | 60/597 |
| 5,787,711 A | * | 8/1998 | Woollenweber et al. .... | 417/407 |
| 5,870,894 A | * | 2/1999 | Woollenweber et al. ...... | 60/607 |
| 6,530,754 B2 | * | 3/2003 | Vogel ........................... | 417/407 |
| 6,705,084 B2 | * | 3/2004 | Allen et al. ................... | 60/608 |

FOREIGN PATENT DOCUMENTS

| | | | | |
|---|---|---|---|---|
| JP | 58144647 A | * | 8/1983 | ................ 60/605.3 |
| JP | 59113236 A | * | 6/1984 | .................. 60/602 |
| JP | 10008976 A | * | 1/1998 | ........... F02B/37/04 |

* cited by examiner

Primary Examiner—Thai-Ba Trieu
(74) Attorney, Agent, or Firm—Ephraim Starr; Chris James

(57) ABSTRACT

Turbocharger control systems used with electric assist turbochargers include an electric motor for controlling turbocharger operation. The system comprises an oil pressure sensor attached to the turbocharger for sensing oil pressure for lubricating a shaft bearing assembly. The pressure sensor provides oil pressure information to a control system that controls the operation of the electric motor and/or other operating parameters of the turbocharger and/or the vehicle. The control system regulates operation of the electric motor during operating conditions where a low oil pressure condition is detected when compared to a predetermined minimum. The control system reactivates the electric motor once a desired minimum oil pressure has been detected.

10 Claims, 2 Drawing Sheets

OIL PRESSURE DETECTOR FOR ELECTRIC ASSISTED TURBOCHARGER

FIELD OF THE INVENTION

This invention relates generally to the field of turbochargers and, more particularly, to an oil pressure detector useful for protecting an electric assisted turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of that shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

The common shaft extending between the turbine and compressor is disposed through a turbocharger center housing that includes a bearing assembly for: (1) facilitating shaft rotation (2) controlling axially directed shaft thrust effects and radially direct shaft vibrations; (3) providing necessary lubrication to the rotating shaft to minimize friction effects and related wear; and (4) providing a seal between the lubricated assembly and the turbine and compressor housings.

Because the rotary action of the turbine is dependent upon the heat and volumetric flow of exhaust gas exiting the engine, turbochargers are often of reduced effectiveness when the engine to which they are coupled is run at a low speed. The reduced effectiveness is often labeled turbo-lag. In order to overcome turbo-lag during operating conditions when the heat and volumetric flow of exhaust gas is low, an electric motor can be used to rotate the shaft and induce the compressor to spin at high speed.

An electric assisted turbocharger is capable of spinning at high speeds when the associated engine is running at very low speeds, or not running at all. During these operating conditions it is very possible that the pressure and flow of lubricating oil to the turbocharger bearing will be insufficient. Insufficient oil flow during high speed electric assisted operation of turbocharger may cause permanent damage to the bearing system. Therefore, it is desirable that a system be devised for detecting/monitoring the flow of lubricating oil to the turbocharger bearing, and for preventing and/or controlling the spinning of the turbocharger shaft when the monitored oil pressure and flow are inadequate.

SUMMARY OF THE INVENTION

A turbocharger control system of this invention is used with turbochargers comprising an electric assist motor for controlling the speed of the turbocharger, to provide desired engine operating characteristics, during engine operation. The system comprises an oil pressure sensor that is attached to the turbocharger at a location capable of receiving oil pressure information of lubricating oil being directed into the center housing for lubricating the shaft bearing assembly. The pressure sensor is configured to provide oil pressure information to a control system that is configured to control the operation of the electric motor and/or other operating parameters of the turbocharger and/or the vehicle.

In an example embodiment, the control system comprises an engine control unit and a motor controller, that are configured to regulate and/or disable operation of the electric motor (thereby controlling the extent of electric assist to the turbocharger) during operating conditions where a low oil pressure condition is detected when compared to a predetermined minimum. The control system is configured to reactivate the electric motor once a desired minimum oil pressure has been detected by and transmitted from the pressure sensor.

Configured in this manner, turbocharger control systems of this invention operate to prevent possible damage to the turbocharger shaft bearings, thereby extending the effective service life of the turbocharger.

BRIEF DESCRIPTION OF THE DRAWINGS

The aspects of the present invention are more readily understood when considered in conjunction with the accompanying drawings and the following detailed description wherein.

DETAILED DESCRIPTION

Electric assisted turbochargers, constructed according to principles of this invention, comprise an oil pressure sensor in oil flow communication with lubricating oil that is directed to the turbocharger shaft bearing. Control means are connected to the oil pressure sensor and are configured to provide a control signal output in response to detected low lubricating oil pressure. The control signal output can be used to, among other things, to control the speed of the electric motor, i.e., reduce or stop the turbocharger electric assist, when a low pressure condition is detected, thereby minimizing and/or eliminating the possibility of shaft bearing damage and extending turbocharger service life.

Figure 1:
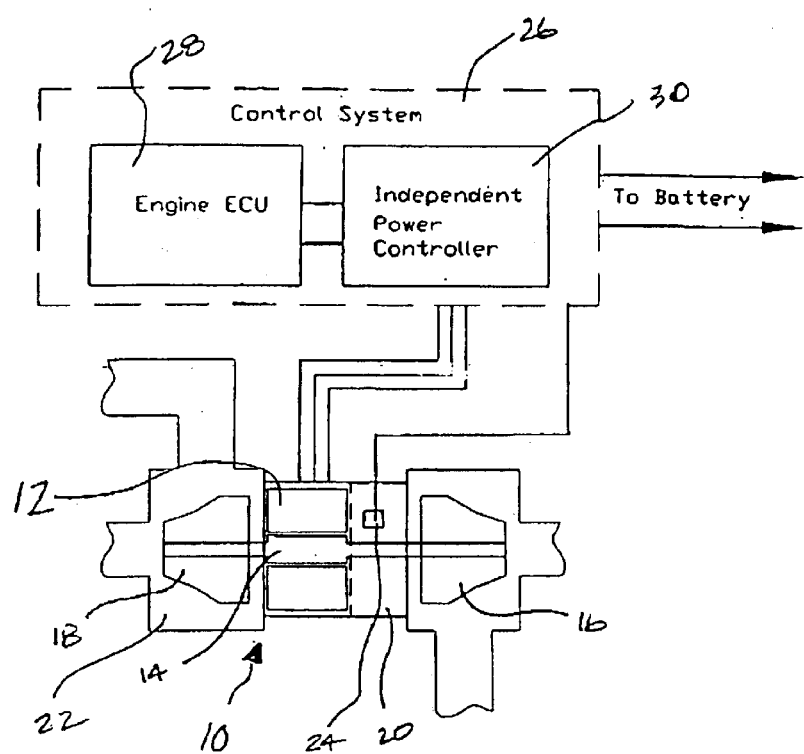
FIG. 1 is a schematic diagram illustrating an electric assisted turbocharger control system, constructed according to principles of this invention, employing an oil pressure detector attached to the turbocharger.

As shown in FIG. 1, an electric assisted turbocharger 10, constructed according to the principles of this invention, generally comprises an electric motor 12 that is disposed around a turbocharger shaft 14 that is common to both the turbine 16 and the compressor 18. The Electric motor 12 is disposed within the turbocharger adjacent the center housing 20, and is interposed axially between the center housing 20 and a compressor housing 22 that houses the compressor 18.

A turbocharger shaft bearing assembly (not shown) is disposed around the shaft and is located within the center housing 20. The center housing is configured having oil passages disposed therein for directing lubricating oil to the shaft during turbocharger operation. The lubricating oil is typically provided by the engine that is being turbocharged, thus is pressurized by the engine oil pump and operation of the engine.

Electric assisted turbochargers of this invention comprise an oil pressure sensor 24 that is attached to the turbocharger, e.g., at the center housing, and is in oil flow communication with the lubricating oil bearing directed to the shaft bearing assembly. The oil pressure sensor 24 provide oil flow pressure information to a control system 26 for purposes of controlling the operation of the turbocharger and, if desired, other vehicle parameters, in the event of a detected low oil pressure condition. In an example embodiment, the control system 26 can be configured to control an engine Electronic Control Unit (ECU) 28 and a turbocharger electric motor controller 30.

If, during operation of the turbocharger, the oil pressure monitored by the oil pressure sensor 24 and communicated to the control system 26 falls below a predetermined minimum pressure, the control system 26 is configured to disable the electric motor 12 providing the electric assist to the turbocharger, thereby reducing shaft rotational speed until such time as the detected oil pressure rises back above the predetermined minimum pressure. Configured in this manner, the oil pressure sensor (when used in combination with the control system) functions to prevent damage to the turbocharger shaft bearing that could occur during operation under conditions of inadequate oil pressure.

Figure 2:
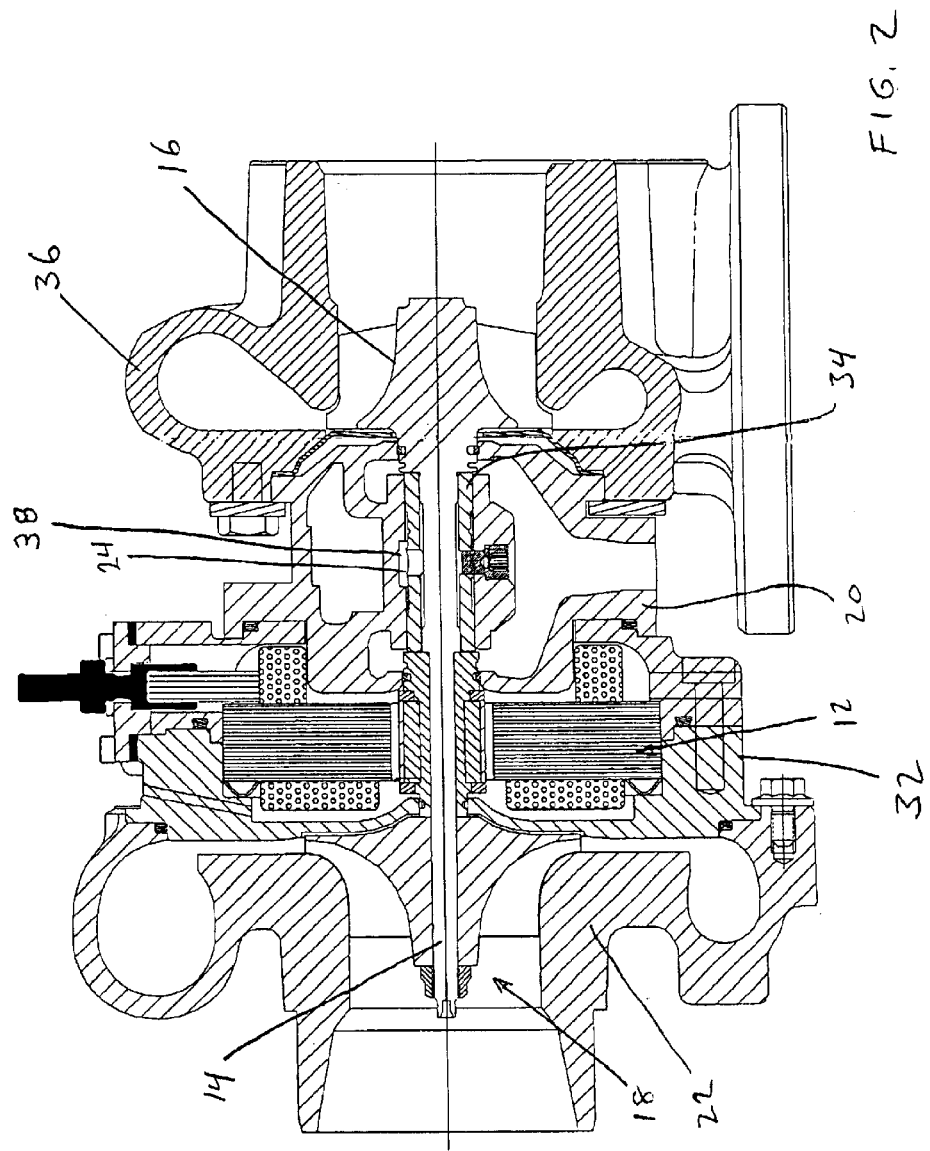
FIG. 2 is a cross-sectional view of an electric assisted turbocharger constructed according to an embodiment of the present invention.

Referring now to FIG. 2, an example electric assisted turbocharger embodiment of this invention comprises (moving axially from left to right) the compressor 18 disposed within the compressor housing 22. To the right of and attached to the compressor housing is a motor housing 32 that contains the electric motor 12. To the right of and attached to the motor housing 32 is the center or bearing housing 20. A bearing assembly 34 is shown disposed within the center housing 20 and positioned around the common shaft 14.

To the right of and attached to the center housing 20 is a turbine housing 36 that houses the turbine 16. Together, the motor housing 32 and the central housing 26 have a central opening extending axially from the compressor 20 to the turbine 16, or alternatively to a turbine and/or compressor backplate. The compressor 18 is attached to one end of the shaft 14, and the shaft projects through central openings of the compressor housing 22, motor housing 32, center housing 20, and turbine housing 36, and is attached at its opposite end to the turbine 16.

As briefly discussed above, the oil pressure sensor 24 is attached to the turbocharger at a position that enables oil flow communication with the lubricating oil being directed to the bearing assembly 34. In an example embodiment, the oil pressure sensor 24 (shown schematically for purposes of reference) is attached to the center housing 20 proximate to an oil inlet 38 (shown schematically for purposes of reference). Thus, lubricating oil being directed to the center housing 22 passes into the oil inlet 34, is communicated to the oil pressure sensor 24, and is directed through the center housing to the bearing assembly for lubricating the shaft.

Referring again to FIG. 1, the oil pressure sensor 24 is connected to the control system 26 for providing an oil pressure indication thereto. In an example embodiment, during turbocharger operation, the oil pressure sensor 24 is configured to send an electrical signal at a designated time interval to the control system 26, indicating the pressure of lubricating oil entering the center housing. The control system 26 is programmed having a logic circuit that regulates the operation of the electric motor 12 (of the electric assist turbocharger 10) based upon the received oil pressure information provided by the oil pressure sensor 24.

If the oil pressure sensor 24 transmits an oil pressure level that is equal to or higher than a preselected oil pressure, the control system 26 allows the turbocharger electric motor 12 to operate normally. If, however, the oil pressure sensor 24 transmits an oil pressure level that is below a predetermined oil pressure, the control system 26 does not provide power to the electric motor 12, thus disabling operation of the electric motor 12. By disabling operation of the electric motor 12, the control system slows rotational operation of the turbocharger shaft to minimize and/or prevent undesired shaft damage caused from underlubrication.

Once the control system 26 has disabled operation of the electric motor 12, it continues to receive oil pressure readings from the oil pressure sensor 24. Once the control system 26 receives a signal from the oil pressure sensor 24 indicating that the oil pressure entering the center housing is equal to or higher than the preselected oil pressure, the control system 26 resumes normal operation of the electric motor 12 to provide the desired electric assist.

In another embodiment of the present invention, additional sensors can be employed to assess additional operating conditions of the turbocharger 10. Such additional sensors are also electrically connected to the control system 26 for purposes of simply monitoring such operating conditions, and providing an output control signal for purposes of controlling on or more operating parameter of the turbocharger or vehicle. In an example embodiment, the additional sensors may include a lubricating oil temperature sensor (to monitor the temperature of the oil being directed to or away from the shaft bearing assembly) and a turbocharger speed sensor (to monitor the rotational speed of the turbocharger shaft). The control system can be configured to control the electric motor 12 according to a plurality of preselected sensor values.

Having now described the invention in detail as required by the patent statutes, those skilled in the art will recognize modifications and substitutions to the specific embodiments disclosed herein. Such modifications are within the scope and intent of the present invention.

What is claimed is:

1. A turbocharger control system comprising:
    a turbocharger comprising:
        a compressor and turbine attached to opposite ends of a common shaft disposed within a center housing, the center housing comprising a bearing assembly disposed around the shaft, and an oil passage to the bearing assembly for providing lubricating oil thereto during turbocharger operation,
        an electric motor positioned around the shaft for effecting rotational movement of the shaft, and
        an oil pressure sensor positioned in fluid communication with the oil passage; and,
    a control system for receiving information from the oil pressure sensor and providing an output signal to control operation of the electric motor when the oil pressure is below a predetermined level.

2. The system as recited in claim 1 wherein the control system is selected from at least one of an engine control unit and an electric motor controller configured to deactivate the electric motor when the oil pressure is below a predetermined level.

3. The system as recited in claim 1 wherein the oil pressure sensor is attached adjacent an oil inlet to the center housing to be in oil flow communication with oil entering the center housing.

4. A turbocharger control system comprising:
    a turbocharger comprising:
        a shaft having a compressor attached at one of its ends and a turbine attached to its other end, the shaft being rotatably disposed within a center housing and carried by a bearing assembly;
an oil passage extending to the bearing assembly to provide lubricating oil to the bearing during turbocharger operation;
an electric motor positioned adjacent the shaft for controlling the rotation of the shaft;
an oil pressure sensor positioned in fluid communication with the oil passage; and
a control system operatively connected to the oil pressure sensor and providing an output signal to the electric motor to control rotation of the shaft based on detected oil pressure.

5. The turbocharger control system as recited in claim 4 wherein the electric motor is disposed around the shaft, and wherein the oil passage is disposed through the center housing and the pressure sensor is connected to the center housing.

6. The turbocharger control system as recited in claim 4 wherein the control system is an engine control unit.

7. The turbocharger control system as recited in claim 4 wherein the control system is an electric motor controller.

8. The turbocharger control system as recited in claim 4 wherein the control system includes a stored predetermined minimum oil pressure.

9. The turbocharger control system as recited in claim 8 wherein the control system operates to stop operation of the electric motor when the detected oil pressure is below the predetermined minimum oil pressure.

10. The turbocharger control system as recited in claim 8 wherein the control system operates to cause operation of the electric motor when the detected oil pressure is above the predetermined minimum oil pressure.

* * * * *